United States Patent
Aksu et al.

(10) Patent No.: US 11,601,947 B2
(45) Date of Patent: Mar. 7, 2023

(54) SYSTEMS AND METHODS FOR NETWORK SLICE SELECTION ACCORDING TO APPLICATION SPECIFIC REQUEST

(71) Applicant: Verizon Patent and Licensing Inc., Basking Ridge, NJ (US)

(72) Inventors: Arda Aksu, Lafayette, CA (US); Lalit R. Kotecha, San Ramon, CA (US); Vishwanath Ramamurthi, San Ramon, CA (US); David Chiang, Fremont, CA (US); Donna L. Polehn, Mercer Island, WA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 114 days.

(21) Appl. No.: 16/995,329

(22) Filed: Aug. 17, 2020

(65) Prior Publication Data

US 2022/0053476 A1 Feb. 17, 2022

(51) Int. Cl.
| | |
|---|---|
| H04W 72/04 | (2009.01) |
| H04L 47/2475 | (2022.01) |
| H04W 28/02 | (2009.01) |
| H04L 67/141 | (2022.01) |

(52) U.S. Cl.
CPC ....... *H04W 72/048* (2013.01); *H04L 47/2475* (2013.01); *H04L 67/141* (2013.01); *H04W 28/0215* (2013.01); *H04W 28/0268* (2013.01)

(58) Field of Classification Search
None
See application file for complete search history.

(56) References Cited

U.S. PATENT DOCUMENTS

| | | | | |
|---|---|---|---|---|
| 2017/0325120 | A1* | 11/2017 | Szilagyi | H04W 28/0268 |
| 2018/0132138 | A1* | 5/2018 | Senarath | H04L 41/0813 |
| 2018/0192426 | A1* | 7/2018 | Ryoo | H04W 24/10 |
| 2018/0199279 | A1* | 7/2018 | Baek | H04W 48/06 |
| 2018/0260200 | A1* | 9/2018 | Karagiannis | H04L 41/5041 |
| 2018/0287891 | A1* | 10/2018 | Shaw | H04W 24/02 |
| 2018/0317163 | A1* | 11/2018 | Lee | H04W 68/02 |
| 2019/0021043 | A1* | 1/2019 | Youn | H04W 36/0055 |

(Continued)

FOREIGN PATENT DOCUMENTS

| | | | |
|---|---|---|---|
| CN | 109474458 | * | 3/2019 |
| CN | 113852995 | * | 2/2021 |

(Continued)

*Primary Examiner* — Andre Tacdiran (57) ABSTRACT

A device of a network may receive a session configuration message for an application session associated with an application of a user equipment (UE) that provided the session configuration message. The device of a network may identify, from the session configuration message, a quality of service (QoS) profile for the application session. The device of a network may determine that the application is authorized to use a network slice of the network that satisfies one or more QoS thresholds of the QoS profile. The device of a network may identify resources of the network that can be configured to satisfy the one or more QoS thresholds. The device of a network may instantiate the resources for communication of application data of the application session. Instantiating the resources may enable the UE to communicate the application data via the network slice using the resources.

20 Claims, 6 Drawing Sheets

(56) References Cited

U.S. PATENT DOCUMENTS

| | | | | |
|---|---|---|---|---|
| 2019/0124572 A1* | 4/2019 | Park | | H04W 80/10 |
| 2020/0112868 A1* | 4/2020 | Shariat | | H04W 8/08 |
| 2020/0196227 A1* | 6/2020 | Young | | G06F 9/45558 |
| 2020/0274912 A1* | 8/2020 | Momchilov | | H04L 67/14 |
| 2020/0322879 A1* | 10/2020 | Zhu | | H04W 76/11 |
| 2021/0289436 A1* | 9/2021 | Hu | | H04W 28/16 |
| 2021/0385724 A1* | 12/2021 | Wang | | H04L 41/40 |
| 2022/0039181 A1* | 2/2022 | Kim | | H04W 88/06 |

FOREIGN PATENT DOCUMENTS

| | | | |
|---|---|---|---|
| WO | WO2018036341 | * | 3/2018 |
| WO | WO2019158219 | * | 1/2019 |

* cited by examiner

SYSTEMS AND METHODS FOR NETWORK SLICE SELECTION ACCORDING TO APPLICATION SPECIFIC REQUEST

BACKGROUND

A fifth generation (5G) or New Radio (NR) network, is a next generation wireless standard that provides various enhancements to wireless communications, such as flexible bandwidth allocation, improved spectral efficiency, ultra-reliable low-latency communications (URLLC), beamforming, high-frequency (e.g., millimeter wave (mmWave)) communication, and/or the like. Furthermore, a 5G network may allow deployment of a distributed core network and a disaggregated radio access network (RAN) architecture to support diverse use cases with vastly different service level agreements (SLAs). Support for these diverse use cases can be achieved through network slices (e.g., logical network instances customized to support the SLAs).

DETAILED DESCRIPTION OF PREFERRED EMBODIMENTS

The following detailed description of example implementations refers to the accompanying drawings. The same reference numbers in different drawings may identify the same or similar elements.

In a wireless telecommunications system, such as a 5G wireless telecommunications network, network slicing can allow for multiple virtual networks to run on a single physical network to support multiple services, applications, and/or entities (e.g., end users, customers, such as organizations that provide a service to end users of the wireless telecommunications systems, and/or the like). In some instances, when a user equipment (UE) requests a connection (e.g., protocol data unit (PDU) connectivity) to the network for an application and/or service, the UE provides the network with information associated with the UE, the application, and/or the service. Such information can include network slice selection assistance information (NSSAI), which can include a collection or list of individual, single-network slice selection assistance information (S-NSSAI) (which can be referred to herein individually as "S-NSSAI" or collectively as "S-NSSAIs"). In general, the S-NSSAI can identify respective network slices associated with the UE. In such cases, a network slice selection function (NSSF) can determine a network slice instance (NSI) (e.g., a virtual network of network functions (NFs) and other resources to support one or more S-NSSAIs) for the S-NSSAI. The NSSF can provide, to an access and mobility management function (AMF), an NSI identifier (NSI ID) associated with the NSI. Further, the AMF can provision a communication session, using the corresponding NSI, for the UE.

In general, a network slice can refer to a logical end-to-end network that can be dynamically created to serve a particular service type with an agreed-upon service level agreement (SLA), where a single UE can access or otherwise connect in parallel to multiple network slices that share a common AMF over a single radio interface (or air interface). Each network slice can be configured to give a very distinct customer experience (e.g., ultra-reliable (UR) services, ultra-high bandwidth (UHB), extremely low-latency, ultra-reliable low-latency communication (URLLC), and/or the like). For example, in a given scenario, a UE could be associated with a first network slice for Internet browsing, a second network slice for an augmented reality (AR) and/or virtual reality (VR) game, a third network slice for vehicle-to-everything (V2X) communication, and/or the like.

In some cases, during the course of a communication session a quality of service (QoS) requirement associated with the communication session may change. However, the AMF may not be able to modify the NSI based on the change in the QoS requirement. Thus, the UE may not be provisioned the resources required to perform a particular function.

Some implementations described herein may relate to an application services management function (ASMF) that enables a configuration of a network slice to be modified based on a current QoS requirement associated with the network slice. For example, the ASMF may monitor an application session that is provisioned to use a network slice of a network. The application session may be associated with an application of a UE that is communicatively coupled to the network. The application session may be provisioned to use a network slice of the network. The ASMF may determine, based on a session configuration message from the application, that a QoS threshold of a QoS profile associated with the application session has been updated. The ASMF may determine a configuration of resources of the network that can be configured to satisfy the QoS threshold. The ASMF may instantiate the resources in the configuration to facilitate communication of application data of the application session.

In this way, the configuration of a network slice may be updated or changed based on a change to a QoS requirement. By updating the configuration of the network slice, the ASMF may ensure more efficient communications in the network. Further, the ASMF may enable the UE to be provided sufficient resources to facilitate the communication of application data of the application session thereby saving computing resources (e.g., processing resources and/or memory resources) and/or network resources by preventing the application session from being terminated, preventing data being dropped due to insufficient resources, and/or the like.

Figure 1A:
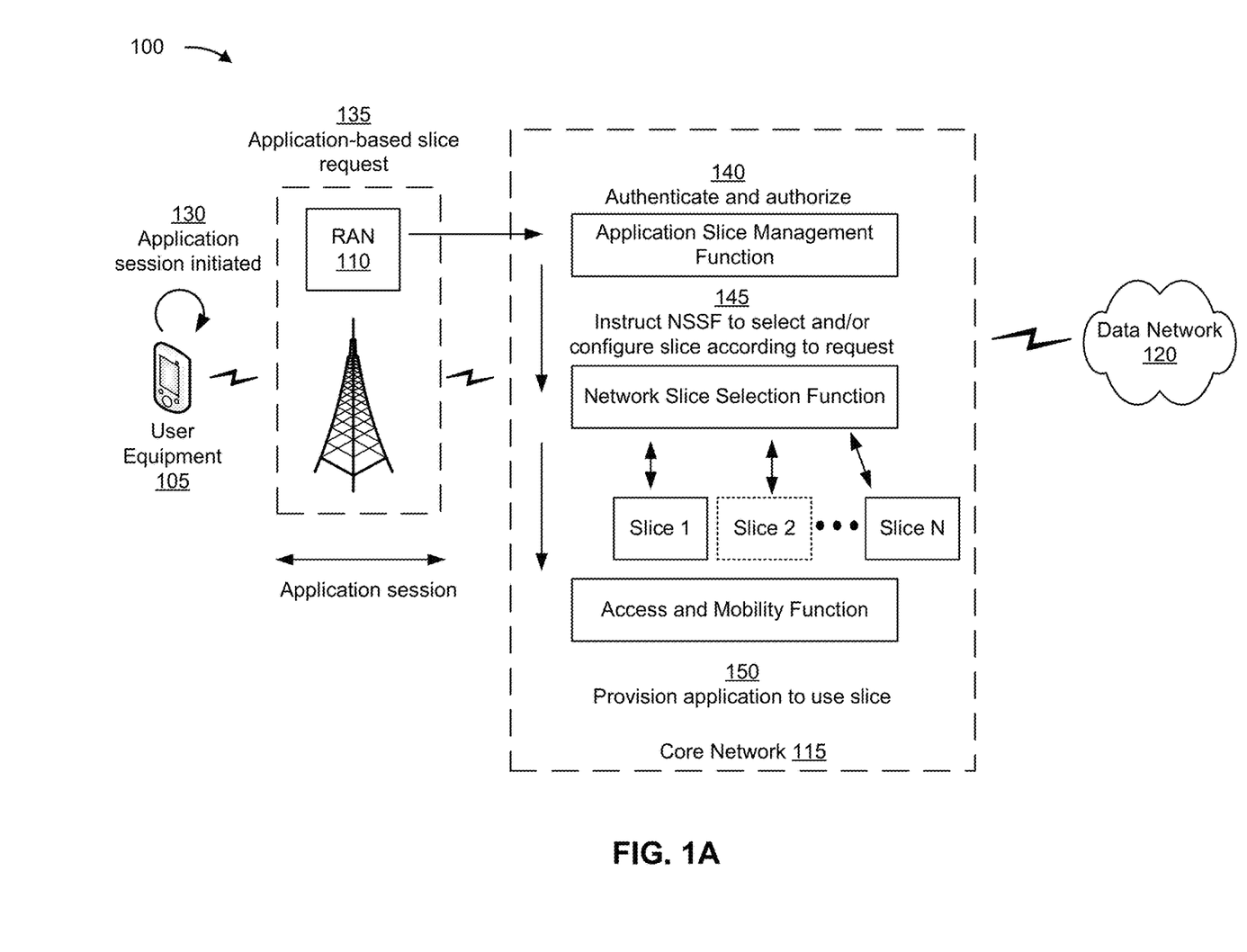
FIGS. 1A-1C are diagrams of an example implementation described herein.
Figure 1B:
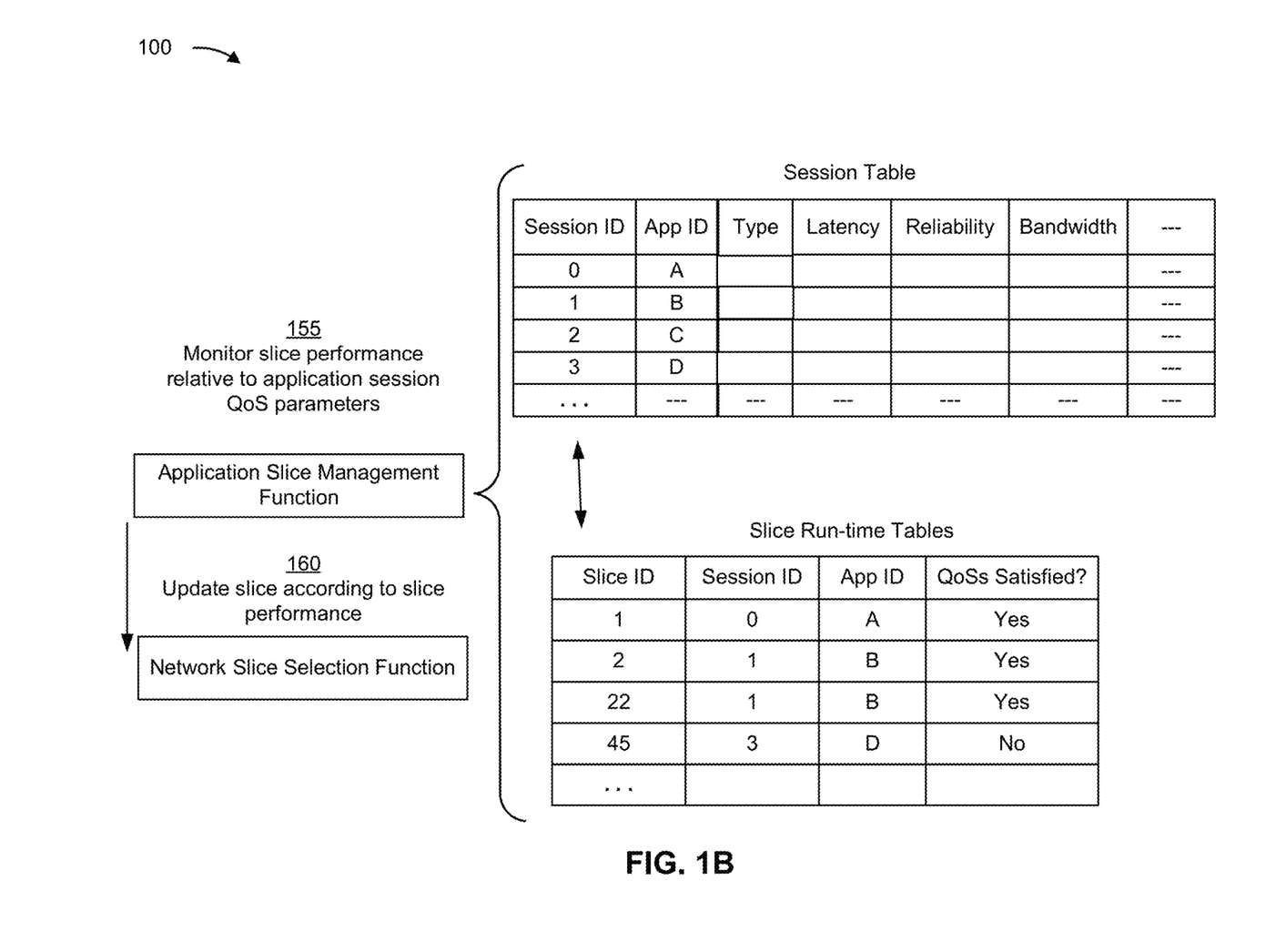
Figure 1C:
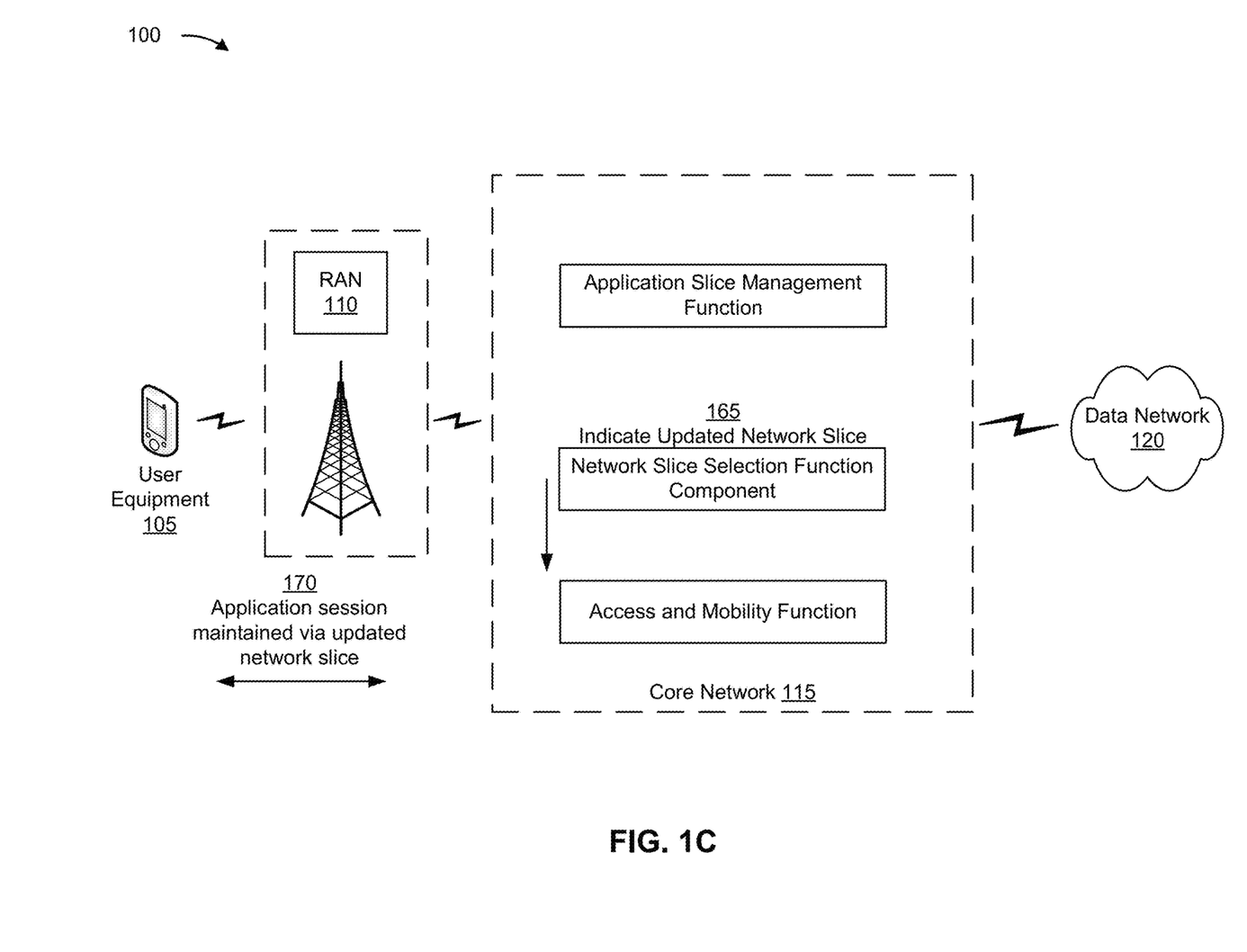

FIGS. 1A-1C are diagrams of one or more example implementations 100 described herein. In particular, example implementation(s) 100 illustrate various portions of a wireless telecommunications system (referred to herein as a "wireless network" or simply "network"), which in some implementations can be a 5G wireless telecommunications system, a 4G wireless telecommunications system, a long-term evolution (LTE) wireless telecommunications system, a LTE-Advanced (LTE-A) wireless telecommunications system, and/or the like.

As shown in FIGS. 1A-1C, example implementation(s) 100 can include a UE 105 wirelessly connected to a radio access network (RAN) 110, which is connected to a data network 120 via a core network 115. The UE 105 may include a communication and/or computing device, such as a mobile phone, a smartphone, a laptop computer, a tablet computer, an Internet of Things device, and/or the like. The RAN 110 may include one or more base stations that provide an access point to the RAN, such as a 5G next generation NodeB (gNodeB or gNB), an LTE evolved NodeB (eNodeB or eNB), and/or the like.

The core network 115 may include various types of telecommunications core networks, such as a 5G next generation core network (NG Core), an LTE evolved packet core (EPC), and/or the like. The data network 120 may include various types of data networks, such as the Internet, a third-party services network, an operator services network, a private network, a wide area network, and/or the like.

As shown in FIG. 1A, and by reference number 130, the UE 105 initiates an application session (e.g., a PDU session) with the data network 120 via the RAN 110 and the core network 115. The UE 105 may execute an application that involves communicating with a device (e.g., an application server) in the data network 120. The UE 105 may initiate an application session to communicate application-specific data during the application session. The UE 105 may initiate the application session by providing an application-based slice request, such as a session configuration message, to the core network 115 via the RAN 110. The application-based sliced request may include a request to establish an application session with a device included in the data network 120, information associated with the UE 105, information associated with an application associated with the application session, and/or the like.

As shown by reference number 135, an application-based slice request may be received by the core network 115. The UE 105 may send a session configuration message (e.g., an application-based slice request) to the base station of the RAN 110 to register the UE 105 with the core network 115 and/or to initiate an application session between the UE 105 and the data network 120.

The session configuration message may include an S-NSSAI. The S-NSSAI can be one of a plurality of S-NSSAIs in an NSSAI of the session configuration message. In some implementations, the session configuration message may identify the data network 120 (e.g., via a data network identifier) that is to be involved in an application session with the UE 105. In some implementations, to send the request, the UE 105 can run an application (e.g., a configuration application) that causes the UE 105 to communicate with an application slice management function (ASMF) component of the core network 115, via the RAN 110, to request that an S-NSSAI associated with the UE 105 be associated with an NSI to permit the UE 105 to engage in an application session with the data network 120.

The RAN 110 (e.g., via the base station) may receive the request and may identify the ASMF component that is to be used to set up an application session (e.g., via an NSI) for the UE 105 and/or register the UE 105. In some implementations, the RAN 110 detects an identifier associated with the UE 105 (e.g., an identifier that is mapped to an ASMF component, a temporary identifier if the UE 105 is not registered with the core network 115, and/or the like) that can be used to identify and/or select the ASMF component of the core network 115.

In some implementations, the ASMF component is selected based on the S-NSSAI and/or an NSSAI associated with the S-NSSAI. For example, the RAN 110 may identify a slice/service type of the S-NSSAIs in an NSSAI. The slice/service type of an S-NSSAI may identify whether the UE 105 is associated with an enhanced mobile broadband (eMBB) service, an ultra-reliable, low-latency (URLLC) service, a mobile Internet of Things (mIoT) service, and/or the like. The RAN 110 may select the ASMF component based on a service/slice type of the S-NSSAIs. The RAN 110 may forward the session configuration message and/or information in the session configuration message to the ASMF component to permit the ASMF component to instruct the NSSF component to identify an NSI for the S-NSSAI, as described herein.

As further shown in FIG. 1A, and by reference number 140, the ASMF component performs an authentication process and/or authorization process associated with the UE 105. For example, the ASMF component may perform the authentication process to authenticate the session configuration message and/or verify that the session configuration message was received from the UE 105 identified in the session configuration message. Furthermore, the ASMF component may perform the authorization process to authorize the UE 105 to register and/or communicate as part of the wireless network based on the S-NSSAI and/or one or more other characteristics of the UE 105.

In some implementations, the ASMF component utilizes a lookup table to determine whether to authenticate and/or authorize the UE 105. For example, the ASMF component may compare the information that identifies the UE 105 included in the session configuration message with information accessible to the ASMF component that identifies devices that are authorized to connect with the wireless network (e.g., devices that subscribe to a wireless network provider that maintains the wireless network, devices that are capable of communicating with a type of the wireless network, and/or the like). Once the ASMF component authenticates and/or authorizes the UE, the ASMF component may determine an NSI for the S-NSSAI as described herein. In this way, the ASMF component may determine whether the UE 105 is a valid device that is capable of communicating over the wireless network and/or whether the UE 105 has permission to connect with the data network 120 (or RAN 110 or core network 115).

The ASMF component may identify a NSI for the application session based on authenticating the UE 105. In some implementations, the ASMF component identifies the NSI based on a QoS profile associated with the application session. The application-based slice request may include a slice identifier of a NSI. The ASMF component may identify the QoS profile based on the slice identifier. For example, the ASMF component may access a data structure that maps QoS profiles to slice identifiers. The ASMF component may identify the QoS profile based on the QoS being mapped to the slice identifier included in the session configuration message.

In some implementations, the ASMF component identifies the NSI based on the NSI satisfying one or more QoS thresholds of the QoS profile. For example, the ASMF component may identify the NSI based on the NSI satisfying a maximum latency threshold, a reliability threshold, a bandwidth threshold, and/or the like. The maximum latency threshold may be associated with a maximum latency associated with the communication of application data during the application session. The reliability threshold may be associated with a minimum reliability associated with the communication of the application data during the application session. The bandwidth threshold may be associated with a minimum bandwidth and/or a maximum bandwidth associated with the communication of the application data during the application session.

In some implementations, the ASMF component identifies the QoS profile and/or the NSI based on a QoS threshold included in the application-based slice request. The ASMF component may determine a QoS parameter associated with the QoS threshold. The ASMF component may access a data structure that maps NSIs to QoS parameters. The ASMF component may identify a NSI mapped to a QoS parameter that satisfies the QoS threshold. The ASMF component may identify a QoS profile associated with the NSI. The ASMF component may identify the QoS profile associated with the NSI for the application session based on the QoS profile being associated with the NSI and based on the NSI being associated with the QoS parameter that satisfies the QoS threshold.

In some implementations, the ASMF component verifies that the UE 105 and/or the application are authorized to use the NSI based on a network service associated with the UE 105 and/or the application. As an example, the ASMF component may determine that the UE 105 (e.g., a user associated with the UE 105) and/or the application subscribed to a network service of the network. The ASMF component may determine that the UE 105 is subscribed to the network service based on a user profile associated with the user, a subscription mapping stored in a data structure that maps users, UEs, applications, and/or the like to network services to which the users, the UEs, the applications, and/or the like are subscribed, and/or the like. The ASMF component may determine that the network service permits use of the NSI by the UE 105 and/or the application. The ASMF component may determine that the UE 105 and/or the application are authorized to use the NSI based on the UE 105 and/or the application being subscribed to the network service and based on the network service permitting use of the NSI by the UE 105 and/or the application.

As shown by reference number 145, the ASMF component may instruct the NSSF component to select and/or configure the NSI according to the application-based slice request. The ASMF component may provide a message to the NSSF component. The message may include the application-based slice request, information identifying the NSI, information instructing the NSSF component to select a NSI that satisfies the one or more QoS thresholds, information instructing the NSSF component to configure the NSI according to the application-based request, and/or the like.

In some implementations, the NSSF component selects the NSI from a plurality of NSIs associated with the core network 115. The NSSF component may identify a plurality of NSIs that satisfy the one or more QoS thresholds. The NSSF component may select the NSI for the application session from the plurality of NSIs. In some implementations, the NSSF component may select the NSI based on a quantity of application sessions associated with the NSI. The NSSF component may identify a respective quantity of application sessions associated with each NSI of the plurality of NSIs. The NSSF component may identify the NSI based on the quantity of users associated with the NSI satisfying a threshold quantity of users.

The NSSF component may identify resources of the network that can be configured to satisfy the one or more QoS thresholds based on the message. In some implementations, the NSSF component may identify the resources based on a location of the UE 105. In some implementations, the NSSF component may determine the location of the UE 105 based on a base station of the RAN 110 that received the application-based slice request from the UE 105. The NSSF component may determine the base station based on information included in the application-based slice request (e.g., an identifier of the base station included in a header of the application-based slice request). The NSSF component may determine a location of the base station.

For example, the NSSF component may determine the location of the base station based on accessing a data structure that stores location information for base stations included in the RAN 110. The NSSF component may determine the location of the UE 105 based on the location information for the base station stored in the data structure. For example, the NSSF component may determine that the location of the UE 105 corresponds to a location indicated by the location information for the base station. The NSSF component may determine a set of available resources of the core network 115 based on the location of the UE 105. The NSSF component may identify the resources of the core network 115 that can be configured to satisfy the one or more QoS thresholds from the set of available resources.

The NSSF component may configure the NSI based on identifying the resources. In some implementations, the NSSF component configures the NSI based on verifying that the UE 105 and/or the application are authorized to use the NSI. The NSSF component may verify that the UE 105 and/or the application are authorized to use the NSI in a manner similar to that described above.

In some implementations, the application-based slice request includes a slice identifier associated with the NSI. The NSSF component may identify the NSI based on the slice identifier. The NSSF component may determine that the NSI is available to facilitate the communication of application data associated with the application session. The NSSF component may configure the NSI to satisfy the one or more QoS threshold based on the NSI being available to facilitate the communication of the application data.

As shown by reference number 150, the AMF component may provision the application to use the NSI. For example, the AMF component may provision the UE 105 to use the NSI in order to register the UE 105 as part of the wireless network and/or enable the UE 105 to engage in a communication session with the data network 120 via the NSI. In some implementations, the AMF component, when receiving and/or sending messages (e.g., PDUs) from and/or to the UE 105, may use the physical resources associated with the NSI to permit the messages to be received or sent.

In some implementations, the AMF component may instantiate the resources of the core network 115 identified by the NSSF component to generate the NSI. The AMF component may provision resources of the NSI to facilitate communication of application data associated with the application session. The AMF component may configure the UE to transmit and/or receive the application data via the NSI using the resources based on provisioning the NSI.

As shown in FIG. 1B, and by reference number 155, the ASMF component monitors the application session relative to the one or more QoS thresholds. The ASMF component may update QoS parameters associated with the NSI based on monitoring the application session. The ASMF component may update the QoS parameters periodically (e.g., about every 1.0 second, every 0.5 ms, and/or the like) and/or based on an occurrence of an event (e.g., the application session being handed-over to another base station, a failure of a provisioned function used by the NSI, receipt of a request to update the QoS parameters, and/or the like).

In some implementations, the ASMF component maintains a session table associated with application sessions associated with the core network 115 based on monitoring the slice performance of the NSI. As shown in FIG. 1B, the session table includes, for an active application session, a session identifier associated with the application session, an application identifier associated with an application associated with the application session, information identifying a type of the application session (e.g., streaming data, Internet browsing, and/or the like), a value of latency parameter associated with the application session, a value of a reliability parameter associated with the application session, a value of a bandwidth parameter associated with the application session, and/or the like.

In some implementations, the ASMF component maintains a slice run-time table based on monitoring the slice performance. The slice run-time table may include information indicating whether QoS parameters of a NSI satisfy QoS thresholds associated with the NSI. For example, as shown in FIG. 1B, for a NSI, the slice run-time table includes a slice identifier, a session identifier, an application identifier, information indicating whether a QoS threshold is satisfied, and/or the like. In some implementations, the ASMF component determines whether the QoS threshold is satisfied based on the information stored in the session table.

As shown by reference number 160, the ASMF component updates the NSI according to the slice performance of the NSI. In some implementations, the ASMF component determines that a metric of the configuration of resources does not satisfy at least one of the one or more QoS thresholds. The ASMF component may determine that a QoS parameter of the NSI does not satisfy a QoS threshold associated with the NSI based on the information maintained in the session table and/or the slice run-time table. For example, as shown in FIG. 1B, the slice run-time table includes information indicating that a QoS threshold associated with a NSI having the slice identifier 45 is not satisfied. The ASMF component may update the NSI based on the QoS threshold not being satisfied.

In some implementations, the ASMF component updates the NSI based on a session configuration message received from the UE 105. In some implementations, the session configuration message may include a message associated with an update to the application session. The message may include information indicating an updated QoS threshold. The ASMF component may determine a configuration of resources of the core network 115 available to be configured to satisfy the updated QoS threshold. The ASMF component may configure and/or instantiate the resources to update the NSI based on the updated QoS threshold.

In some implementations, the session configuration message is received in association with a particular operation of the application being performed during the application session. In some implementations, the session configuration message is associated with a particular operation of the application being performed during the application session. The UE 105 may determine that the application is to perform a particular operation (e.g., an operation associated with communicating high resolution video, an operation associated with communicating voice data, and/or the like) during the application session. The UE 105 may transmit the session configuration message to the ASMF component based on determining that the application is to perform the particular operation during the application session.

The ASMF component may determine a second QoS profile associated with the application session during the second operation. The ASMF component may update the NSI based on one or more QoS thresholds associated with the second QoS profile.

In some implementations, the ASMF component determines to update the NSI based on provisioning additional resources for the application session. The AMF component may instantiate additional resources of the core network 115 for the application session to update the NSI and/or to enable the metric to satisfy the QoS threshold.

In some implementations, the ASMF component updates the NSI based on instantiating a new NSI. The ASMF component may terminate the NSI and may cause a new NSI to be provisioned for the application session. The new NSI may be provisioned in a manner similar to that described above. In some implementations, the ASMF component may instantiate the new NSI based on a quantity of application sessions associated with the NSI. The ASMF component may determine that the quantity of application sessions satisfies a threshold quantity and may terminate the NSI and/or instantiate the new NSI based on the quantity of application sessions satisfying the threshold quantity.

In some implementations, the NSI is updated by moving the application session to another NSI. The ASMF component may identify an active NSI that is available to be utilized for the application session and/or satisfies the QoS thresholds associated with the application.

In some implementations, updating the NSI enables the application to utilize multiple NSIs to transmit the application data. For example, the NSI may be updated by establishing a second application session via the other NSI. The application may utilize the other NSI to transmit application data associated with performing the particular operation. The application may utilize the initial NSI to transmit application data other than the application data associated with performing the particular operation. In this way, the ASMF component may enable the application to utilize multiple NSIs (e.g., simultaneously, alternately, and/or the like) to transmit the application data thereby enabling different types of application data to be provided different levels of service based on the type of application data being transmitted.

As shown in FIG. 1C, and by reference number 165, information indicating the updated NSI is provided to the AMF component. The AMF component may receive the information and may provision the updated NSI. In some implementations, the information indicates that the NSI is to be updated based on provisioning additional resources for the application session. The AMF component may identify available resources of the core network 115 for updating the NSI and may provision the identified resources for the application session.

In some implementations, the information indicates that a new NSI is to be provisioned and/or that the current NSI is to be terminated. In some implementations, the AMF component may provision the new NSI in a manner similar to that described above. The AMF component may terminate the current NSI based on provisioning the new NSI. Alternatively, and/or additionally, the AMF component may terminate the current NSI based on the application session being maintained via the new NSI.

As shown by reference number 170, the application session is maintained via the updated NSI. In some implementations, the application session is maintained via the NSI based on the additional resources being provisioned for the application session. The AMF component may provide the UE 105 information indicating that the additional resources have been provisioned for the application session. In some implementations, the application may perform the particular operation based on receiving the information indicating that the additional resources have been provisioned.

In some implementations, the application session is maintained via the active NSI. The AMF component may cause the UE 105 to utilize the active NSI. For example, the AMF component may provide the UE 105 information identifying the active NSI, information indicating that the UE 105 is to terminate the application session and re-establish the application session via the active NSI, and/or the like. The UE 105 may maintain the application session via the active NSI based on the information provided by the AMF component.

In some implementations, the application session is maintained via the new NSI. The AMF component may cause the UE 105 to utilize the new NSI. For example, the AMF component may provide the UE 105 information identifying the new NSI, information indicating that the UE 105 is to terminate the application session and re-establish the application session via the new NSI, and/or the like. The UE 105 may maintain the application session via the active NSI based on the information provided by the AMF component. In some implementations, the AMF component may determine that the application session is being maintained via the new NSI. For example, the AMF component may receive information from the UE 105 and/or the ASMF component indicating that the application session is being maintained via the new NSI. The AMF component may terminate the NSI previously used for the application session based on receiving the information indicating that the application session is being maintained via the new NSI.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
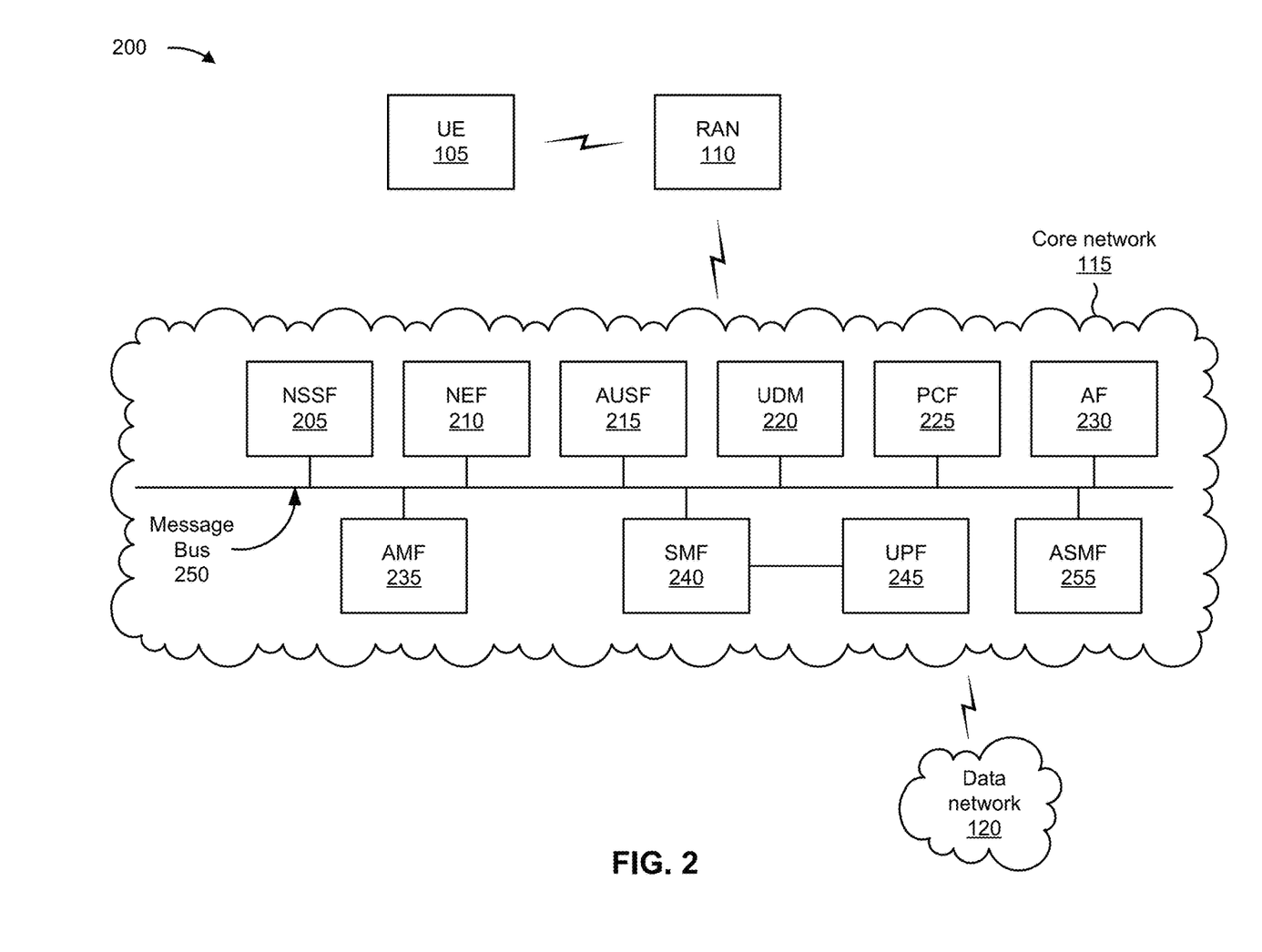
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a UE 105, a RAN 110, a core network 115, and a data network 120. Devices and/or networks of example environment 200 may interconnect via wired connections, wireless connections, or a combination of wired and wireless connections.

UE 105 includes one or more devices capable of receiving, generating, storing, processing, and/or providing information, such as information described herein. For example, UE 105 can include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 110 may support, for example, a cellular radio access technology (RAT). RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 105. RAN 110 may transfer traffic between UE 105 (e.g., using a cellular RAT), one or more base stations (e.g., using a wireless interface or a backhaul interface, such as a wired backhaul interface), and/or core network 115. RAN 110 may provide one or more cells that cover geographic areas.

In some implementations, RAN 110 may perform scheduling and/or resource management for UE 105 covered by RAN 110 (e.g., UE 105 covered by a cell provided by RAN 110). In some implementations, RAN 110 may be controlled or coordinated by a network controller, which may perform load balancing, network-level configuration, and/or the like. The network controller may communicate with RAN 110 via a wireless or wireline backhaul. In some implementations, RAN 110 may include a network controller, a self-organizing network (SON) module or component, or a similar module or component. In other words, RAN 110 may perform network control, scheduling, and/or network management functions (e.g., for uplink, downlink, and/or sidelink communications of UE 105 covered by RAN 110).

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture, a 4G core network, and/or the like.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, an application slice management function (ASMF), and/or the like. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 205 includes one or more devices that select network slice instances for UE 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating UE 105 in the wireless telecommunications system.

UDM 220 includes one or more devices that store user data and profiles in the wireless telecommunications system. UDM 220 may be used for fixed access, mobile access, and/or the like, in core network 115.

PCF 225 includes one or more devices that provide a policy framework that incorporates network slicing, roaming, packet processing, mobility management, and/or the like.

AF 230 includes one or more devices that support application influence on traffic routing, access to NEF 210, policy control, and/or the like.

AMF 235 includes one or more devices that act as a termination point for non-access stratum (NAS) signaling, mobility management, and/or the like.

SMF 240 includes one or more devices that support the establishment, modification, and release of communication sessions in the wireless telecommunications system. For example, SMF 240 may configure traffic steering policies at UPF 245, enforce user equipment IP address allocation and policies, and/or the like.

UPF 245 includes one or more devices that serve as an anchor point for intraRAT and/or interRAT mobility. UPF 245 may apply rules to packets, such as rules pertaining to packet routing, traffic reporting, handling user plane QoS, and/or the like.

Message bus 250 represents a communication structure for communication among the functional elements. In other words, message bus 250 may permit communication between two or more functional elements.

ASMF 255 includes one or more devices that configures network slice instances for UE 105, as described herein. By configuring network slices, ASMF 255 allows a configuration of a network slice to be updated based on an operation performed by an application. In some implementations, ASMF 255 may be co-located with and/or included in NSSF 205.

Data network 120 includes one or more wired and/or wireless data networks. For example, data network 120 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
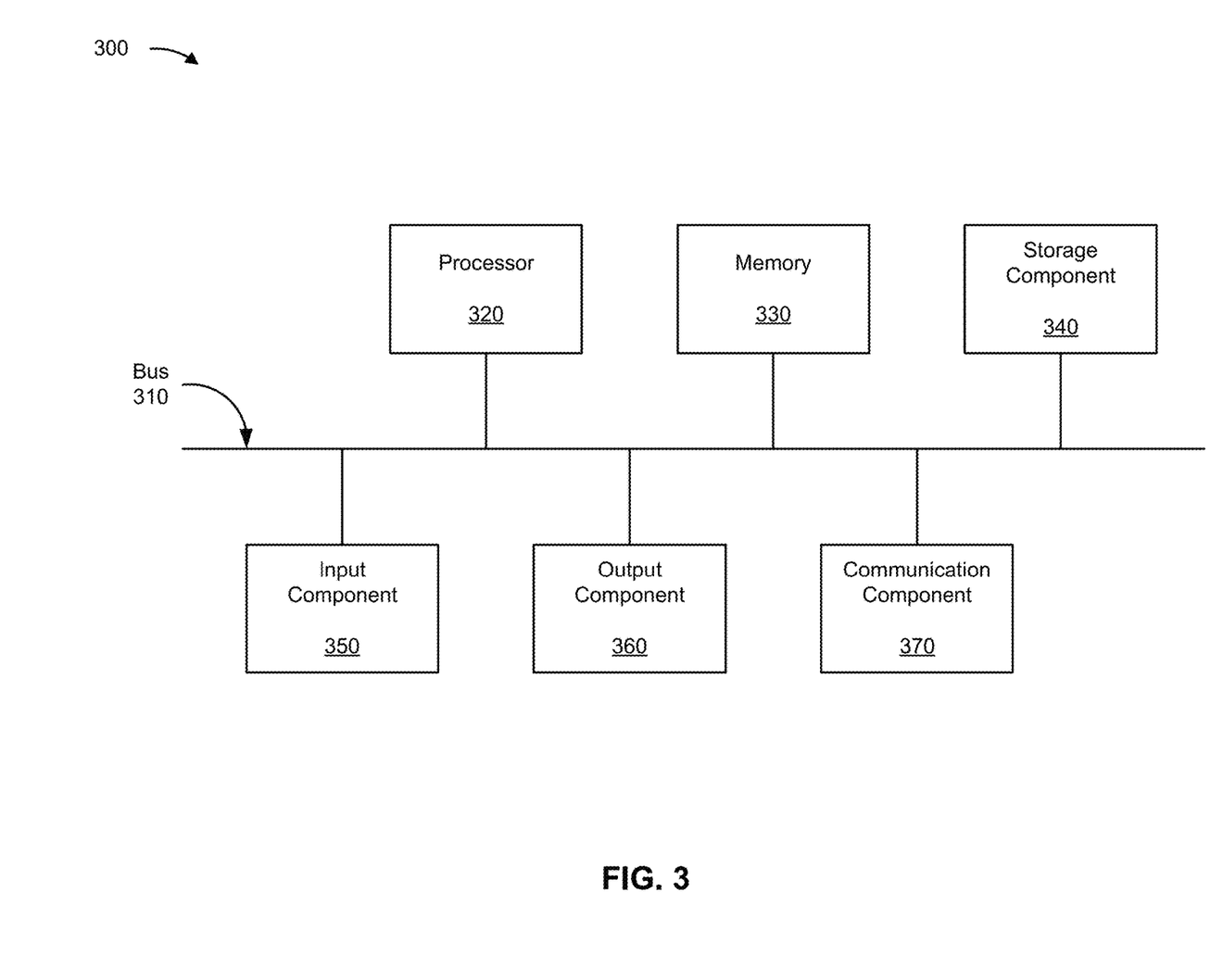
FIG. 3 is a diagram of example components of one or more devices of FIG. 2.

FIG. 3 is a diagram of example components of a device 300, which may correspond to UE 105 NSSF 205, NEF 210, AUSF 215, UDM 220, PCF 225, AF 230, AMF 235, SMF 240, UPF 245, and/or ASMF 255. In some implementations, UE 105 NSSF 205, NEF 210, AUSF 215, UDM 220, PCF 225, AF 230, AMF 235, SMF 240, UPF 245, and/or ASMF 255 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
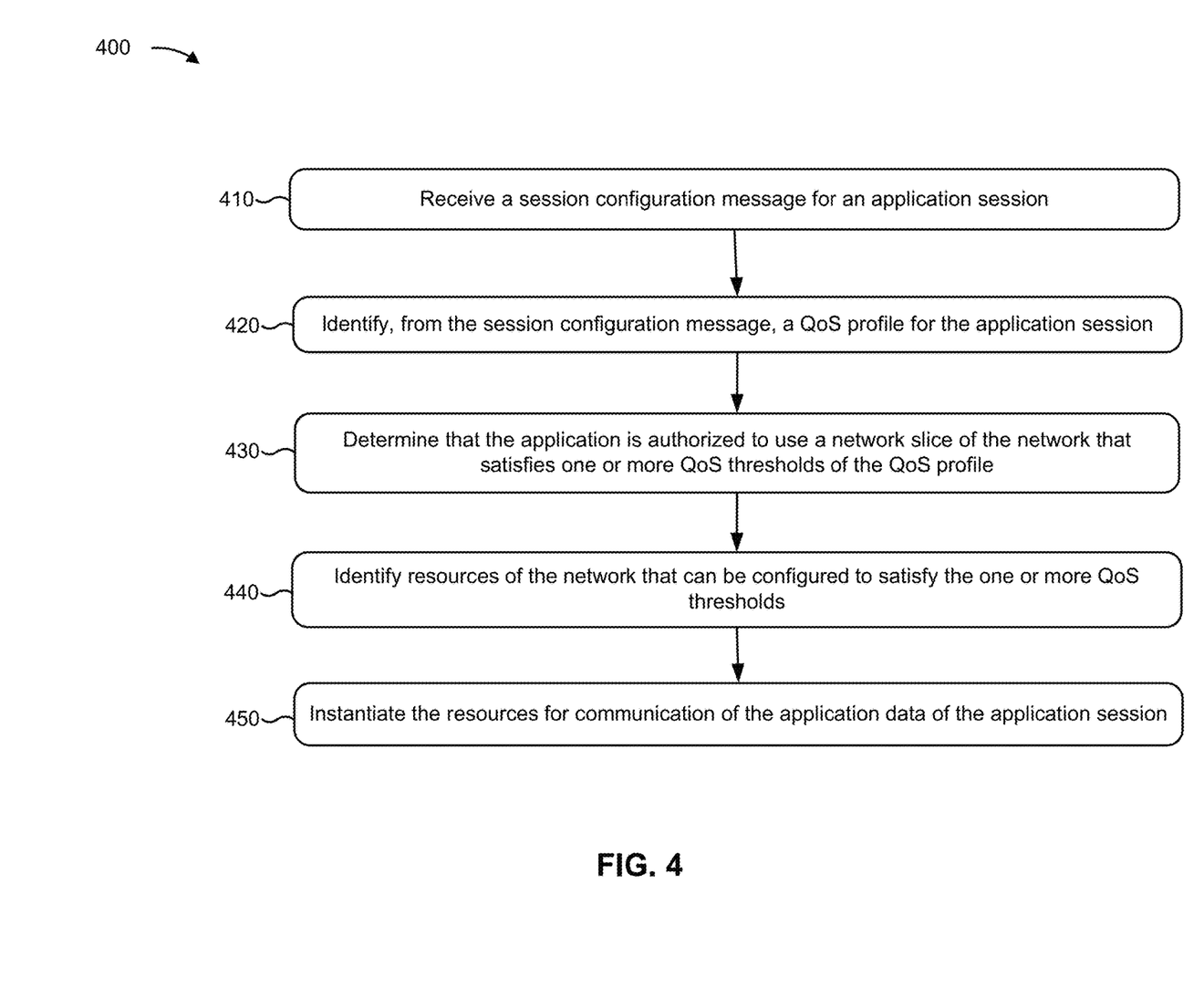
FIG. 4 is a flow chart of an example process relating to network slice selection according to application specific requests.

FIG. 4 is a flowchart of an example process 400 associated with systems and methods for network slice selection according to application specific request. In some implementations, one or more process blocks of FIG. 4 may be performed by a device (e.g., ASMF 255). In some implementations, one or more process blocks of FIG. 4 may be performed by another device or a group of devices separate from or including the device, such as a UE (e.g., UE 105), a NSSF (e.g., NSSF 205), a NEF (e.g., NEF 210), a AUSF (e.g., AUSF 215), a UDM (e.g., UDM 220), a PCF (e.g., PCF 225), an AF (e.g., AF 230), an AMF (e.g., AMF 235), a SMF (e.g., SMF 240), an UPF (e.g., UPF 245), and/or an ASMF (e.g., ASMF 255). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a session configuration message for an application session (block 410). For example, the device may receive a session configuration message for an application session, as described above. In some implementations, the application session is associated with an application of a user equipment (UE) that provided the session configuration message.

In some implementations, the session configuration message includes a slice identifier of the network slice, and wherein the QoS profile is identified based on being mapped to the slice identifier in a data structure. Alternatively, and/or additionally, the session configuration message includes a first QoS threshold, of the one or more QoS thresholds, associated with a first QoS parameter, and wherein the QoS profile is determined based on the network slice being mapped to a QoS parameter that satisfies the first QoS threshold.

In some implementations, the session configuration message corresponds to a request to initiate the application session via the network slice, and the application is determined to be authorized to use the network slice based on the application being subscribed to a network service of the network that permits use of the network slice.

The session configuration message may be associated with a particular operation of the application being performed during the application session. The session configuration message may be configured to dynamically cause network resources to be dynamically changed during execution of the particular operation.

As further shown in FIG. 4, process 400 may include identifying, from the session configuration message, a QoS profile for the application session (block 420). For example, the device may identify, from the session configuration message, a QoS profile for the application session, as described above. Prior to determining the QoS profile, the device may verify, based on a subscription mapping, that the UE and the application are authorized to use the network slice.

As further shown in FIG. 4, process 400 may include determining that the application is authorized to use a network slice of the network that satisfies one or more QoS thresholds of the QoS profile (block 430). For example, the device may determine that the application is authorized to use a network slice of the network that satisfies one or more QoS thresholds of the QoS profile, as described above.

As further shown in FIG. 4, process 400 may include identifying resources of the network that can be configured to satisfy the one or more QoS thresholds (block 440). For example, the device may identify resources of the network that can be configured to satisfy the one or more QoS thresholds, as described above. The one or more QoS thresholds may be associated with at least one of a maximum latency associated with the communication of the application data; a minimum reliability associated with the communication of the application data; or a minimum bandwidth associated with the communication of the application data.

In some implementations, identifying the resources comprises determining a location of the UE, and identifying the resources, from a set of available resources of the network, based on the location of the UE. In some implementations, the device selects the network slice from a plurality of network slices of the network. The device may provision resources of the network slice to facilitate communication of the application data.

The session configuration message may include a slice identifier of the network slice. The network slice may be configured based on the slice identifier and based on being available to facilitate the communication of the application data. Alternatively, and/or additionally, the network slice may be configured based on verifying that the UE and the application are authorized to use the network slice.

When configuring the network slice, the device may determine a location of the UE, select, based on the location of the UE, resources from a set of available resources of the network; and instantiate the resources to form the network slice.

As further shown in FIG. 4, process 400 may include instantiating the resources for communication of application data of the application session (block 450). For example, the device may instantiate the resources for communication of application data of the application session, as described above. The device may instantiate the resources in combination with slice resources of the network slice, or instantiate the resources to form a new network slice of the network. Instantiating the resources may enable the UE to communicate the application data via the network slice using the resources.

In some implementations, the device may monitor the application session relative to the one or more QoS thresholds, determine that a metric of the configuration of resources does not satisfy at least one of the one or more QoS thresholds, and instantiate additional resources, of the network and for the application session, to cause the metric to satisfy the one or more QoS thresholds.

In some implementations, the device may receive a second session configuration message that is associated with a second operation of the application; determine a second QoS profile for the application session during the second operation; configure a second network slice based on one or more other QoS thresholds of the second QoS profile; and provision the second network slice to facilitate communication of application data associated with the second operation. The second session configuration message may be received in association with a particular operation of the application being performed during the application session. The QoS threshold may be configured to be updated for the application session during the particular operation.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device of a network, a first session configuration message from a user equipment (UE), for an application session,
      wherein the application session is associated with an application of the UE, and
      wherein the first session configuration message is associated with a first operation related to the application;
   identifying, by the device and from the first session configuration message, a first quality of service (QoS) profile for the application session;
   determining, by the device, that the application is authorized to use a first network slice of the network that satisfies one or more QoS thresholds of the first QoS profile;
   identifying, by the device, resources of the network to be configured to satisfy the one or more QoS thresholds;
   instantiating, by the device, the resources for communication of application data of the application session,
      wherein instantiating the resources enables the UE to communicate the application data via the first network slice using the resources;
   receiving, by the device, a second session configuration message associated with a second operation of the application;
   determining, by the device, a second QoS profile associated with the second operation;
   configuring, by the device and based on one or more other QoS thresholds associated with the second QoS profile, a second network slice; and
   provisioning, by the device, the second network slice for communication of application data associated with the second operation.

2. The method of claim 1, wherein the first session configuration message includes a slice identifier of the first network slice, and
   wherein the first QoS profile is identified based on being mapped to the slice identifier in a data structure.

3. The method of claim 1, wherein the first session configuration message includes a first QoS threshold, of the one or more QoS thresholds, associated with a first QoS parameter, and
   wherein the first QoS profile is determined based on the first network slice being mapped to a QoS parameter that satisfies the first QoS threshold.

4. The method of claim 1, wherein the first session configuration message corresponds to a request to initiate the application session via the first network slice, and
   wherein the application is determined to be authorized to use the first network slice based on the application being subscribed to a network service of the network that permits use of the first network slice.

5. The method of claim 1, wherein the first session configuration message is associated with a particular operation of the application being performed during the application session, and
   wherein the first session configuration message is configured to dynamically cause network resources to be dynamically changed during execution of the particular operation.

6. The method of claim 1, wherein identifying the resources comprises:
   determining a location of the UE; and
   identifying the resources, from a set of available resources of the network, based on the location of the UE.

7. The method of claim 1, further comprising:
   monitoring the application session relative to the one or more QoS thresholds;
   determining that a metric of a configuration of the resources does not satisfy at least one of the one or more QoS thresholds; and instantiating additional resources, of the network and for the application session, to cause the metric to satisfy the one or more QoS thresholds.

8. A device, comprising:
one or more processors configured to:
receive a first session configuration message for an application session associated with an application on a user equipment (UE) that is configured to communicate with a network,
wherein the first session configuration message is associated with a first operation related to the application;
determine, based on the first session configuration message, a first quality of service (QoS) profile for the application session;
identify resources of the network to be configured to satisfy one or more QoS thresholds of the first QoS profile;
provision a first network slice to facilitate communication of application data of the application session;
receive a second session configuration message associated with a second operation of the application;
determine a second QoS profile associated with the second operation;
configure, based on one or more other QoS thresholds associated with the second QoS profile, a second network slice; and
provision the second network slice for communication of application data associated with the second operation.

9. The device of claim 8, wherein the first session configuration message includes a slice identifier of the first network slice, and
wherein the first network slice is configured based on the slice identifier and based on being available to facilitate the communication of the application data.

10. The device of claim 8, wherein the one or more processors, prior to determining the first QoS profile, are configured to:
verify, based on a subscription mapping, that the UE and the application are authorized to use the first network slice,
wherein the first network slice is configured based on verifying that the UE and the application are authorized to use the first network slice.

11. The device of claim 8, wherein the one or more processors, when configuring the first network slice, are configured to:
select the first network slice from a plurality of network slices of the network; and
provision resources of the first network slice to facilitate communication of the application data.

12. The device of claim 8, wherein the one or more processors, when configuring the first network slice, are configured to:
determine a location of the UE;
select, based on the location of the UE, resources from a set of available resources of the network; and
instantiate the resources to form the first network slice.

13. The device of claim 8, wherein the one or more processors are further configured to:
monitor the application session relative to the one or more QoS thresholds;
determine that a metric of a configuration of resources does not satisfy at least one of the one or more QoS thresholds; and
instantiate additional resources, of the network and for the application session, to cause the metric to satisfy the one or more QoS thresholds.

14. A non-transitory computer-readable medium storing a set of instructions, the set of instructions comprising:
one or more instructions that, when executed by one or more processors of a device, cause the device to:
receive a first session configuration message from a user equipment (UE), for an application session,
wherein the application session is associated with an application of the UE, and
wherein the first session configuration message is associated with a first operation related to the application;
identify, from the first session configuration message, a first quality of service (QoS) profile for the application session;
determine that the application is authorized to use a first network slice of the network that satisfies one or more QoS thresholds of the first QoS profile;
identify resources of the network to be configured to satisfy the one or more QoS thresholds;
instantiate the resources for communication of application data of the application session,
wherein instantiating the resources enables the UE to communicate the application data via the first network slice using the resources;
receive a second session configuration message associated with a second operation of the application;
determine a second QoS profile associated with the second operation;
configure, based on one or more other QoS thresholds associated with the second QoS profile, a second network slice; and
provision the second network slice for communication of application data associated with the second operation.

15. The non-transitory computer-readable medium of claim 14, wherein the first session configuration message includes a slice identifier of the first network slice, and
wherein the first QoS profile is identified based on being mapped to the slice identifier in a data structure.

16. The non-transitory computer-readable medium of claim 14, wherein the first session configuration message includes a first QoS threshold, of the one or more QoS thresholds, associated with a first QoS parameter, and
wherein the first QoS profile is determined based on the first network slice being mapped to a QoS parameter that satisfies the first QoS threshold.

17. The non-transitory computer-readable medium of claim 14, wherein the first session configuration message corresponds to a request to initiate the application session via the first network slice, and
wherein the application is determined to be authorized to use the first network slice based on the application being subscribed to a network service of the network that permits use of the first network slice.

18. The non-transitory computer-readable medium of claim 14, wherein the first session configuration message is associated with a particular operation of the application being performed during the application session, and
wherein the one or more instructions further cause the device to dynamically cause network resources to be dynamically changed during execution of the particular operation.

19. The non-transitory computer-readable medium of claim 14, wherein the one or more instructions, that cause the device to identify the resources, further cause the device to:
  determine a location of the UE; and
  identify the resources, from a set of available resources of the network, based on the location of the UE.

20. The non-transitory computer-readable medium of claim 14, wherein the one or more instructions further cause the device to:
  monitor the application session relative to the one or more QoS thresholds;
  determine that a metric of a configuration of the resources does not satisfy at least one of the one or more QoS thresholds; and
  instantiate additional resources, of the network and for the application session, to cause the metric to satisfy the one or more QoS thresholds.

\* \* \* \* \*